(12) United States Patent
Hawkins

(10) Patent No.: US 9,992,413 B2
(45) Date of Patent: Jun. 5, 2018

(54) METHOD AND SYSTEM FOR CREATING A DISPLAY WITH A DISTRIBUTED APERTURE SYSTEM

(71) Applicant: Raytheon Company, Waltham, MA (US)

(72) Inventor: Gregory S. Hawkins, Plano, TX (US)

(73) Assignee: Raytheon Company, Waltham, MA (US)

( * ) Notice: Subject to any disclaimer, the term of this patent is extended or adjusted under 35 U.S.C. 154(b) by 230 days.

(21) Appl. No.: 14/858,101

(22) Filed: Sep. 18, 2015

(65) Prior Publication Data

US 2017/0085791 A1 Mar. 23, 2017

(51) Int. Cl.
| | |
|---|---|
| *H04N 5/00* | (2011.01) |
| *H04N 5/232* | (2006.01) |
| *G06F 3/01* | (2006.01) |
| *G06T 7/00* | (2017.01) |
| *G06T 15/20* | (2011.01) |
| *G06T 17/10* | (2006.01) |
| *G06T 3/40* | (2006.01) |

(52) U.S. Cl.
CPC ......... *H04N 5/23238* (2013.01); *G06F 3/013* (2013.01); *G06T 3/4038* (2013.01); *G06T 7/004* (2013.01); *G06T 7/0085* (2013.01); *G06T 15/20* (2013.01); *G06T 17/10* (2013.01); *G06T 2207/30244* (2013.01)

(58) Field of Classification Search
CPC ....... G06T 15/10; G06T 15/20; G06T 15/205; G06T 15/04
See application file for complete search history.

(56) References Cited

U.S. PATENT DOCUMENTS

| | | | | |
|---|---|---|---|---|
| 6,005,611 A | * | 12/1999 | Gullichsen | G06T 3/0018 348/143 |
| 6,028,584 A | * | 2/2000 | Chiang | G06T 3/0062 345/628 |
| 6,052,128 A | * | 4/2000 | Narayanaswami | G06T 15/30 345/620 |
| 8,274,564 B2 | * | 9/2012 | Girgensohn | H04N 5/247 348/143 |
| 2004/0169617 A1 | * | 9/2004 | Yelton | G06T 15/04 345/1.1 |
| 2004/0169663 A1 | * | 9/2004 | Bernier | G06T 15/205 345/629 |

(Continued)

OTHER PUBLICATIONS

International Search Report and Written Opinion from related PCT Application No. PCT/US2016/031127 dated Feb. 24, 2017.

*Primary Examiner* — Frank Huang
(74) *Attorney, Agent, or Firm* — Burns & Levinson, LLP; Joseph M. Maraia

(57) ABSTRACT

A method for displaying images captured by a distributed aperture system (DAS) includes determining a display line of sight (LOS) and display field of view (FOV) corresponding to an operator display of a DAS, mapping the display LOS and the display FOV to a set of sensors of a plurality of sensors of the DAS, for each sensor of the set of sensors: identifying a set of sensor elements that define a minimum image capture area corresponding to the display LOS and the display FOV, processing image data collected by the identified set of sensor elements; and generating an image for the operator display from the processed image data.

8 Claims, 20 Drawing Sheets

(56) References Cited

U.S. PATENT DOCUMENTS

| | | | |
|---|---|---|---|
| 2006/0066608 A1* | 3/2006 | Appolloni | G06T 15/06 345/419 |
| 2007/0285560 A1* | 12/2007 | Perlman | G06T 1/0007 348/371 |
| 2007/0294621 A1* | 12/2007 | Hansen | G06F 17/3005 715/716 |
| 2011/0025853 A1* | 2/2011 | Richardson | G06T 7/246 348/159 |
| 2011/0080424 A1* | 4/2011 | Peters | H04N 1/387 345/620 |
| 2011/0142281 A1* | 6/2011 | He | G01C 23/00 382/103 |
| 2011/0149074 A1* | 6/2011 | Lee | H04N 7/181 348/143 |
| 2013/0155058 A1* | 6/2013 | Golparvar-Fard | G06T 19/006 345/419 |

* cited by examiner

Compute a coordinate transformation matrix which converts vectors from the Display Line Of Sight (LOS) coordinate frame to the Sensor LOS coordinate frame. For example, if $\phi_{FPA}$ represents the Sensor roll angle, $\theta_{FPA}$ represents Sensor elevation angle, $\psi_{FPA}$ represents Sensor azimuth angle, and if $\phi_{LOS}$, $\theta_{LOS}$, and $\psi_{LOS}$ represent the corresponding Display LOS orientation angles, where all angles are measured relative to the same reference coordinate frame such as a platform's [forward, right, down] frame, then the coordinate transformation matrix which converts vectors from the Display Line Of Sight (LOS) coordinate frame to the Sensor LOS coordinate frame could be computed according to the equation $$\mathbf{T}_{LOS}^{SEN} = \mathbf{T}_{NED}^{SEN} \mathbf{T}_{LOS}^{NED}$$

$$= \begin{bmatrix} 1 & 0 & 0 \\ 0 & \cos(\phi_{FPA}) & \sin(\phi_{FPA}) \\ 0 & -\sin(\phi_{FPA}) & \cos(\phi_{FPA}) \end{bmatrix} \begin{bmatrix} \cos(\theta_{FPA}) & 0 & -\sin(\theta_{FPA}) \\ 0 & 1 & 0 \\ \sin(\theta_{FPA}) & 0 & \cos(\theta_{FPA}) \end{bmatrix}$$

$$\times \begin{bmatrix} \cos(\psi_{LOS} - \psi_{FPA}) & -\sin(\psi_{LOS} - \psi_{FPA}) & 0 \\ \sin(\psi_{LOS} - \psi_{FPA}) & \cos(\psi_{LOS} - \psi_{FPA}) & 0 \\ 0 & 0 & 1 \end{bmatrix}$$

$$\times \begin{bmatrix} \cos(\theta_{LOS}) & 0 & \sin(\theta_{LOS}) \\ 0 & 1 & 0 \\ -\sin(\theta_{LOS}) & 0 & \cos(\theta_{LOS}) \end{bmatrix} \begin{bmatrix} 1 & 0 & 0 \\ 0 & \cos(\phi_{LOS}) & -\sin(\phi_{LOS}) \\ 0 & \sin(\phi_{LOS}) & \cos(\phi_{LOS}) \end{bmatrix}$$

METHOD AND SYSTEM FOR CREATING A DISPLAY WITH A DISTRIBUTED APERTURE SYSTEM

STATEMENT OF GOVERNMENT INTEREST

This invention was made and funded by the U.S. Government, specifically by the Defense Microelectronics Activity Contracting Office under Contract H94003-04-D-0006-0214. The U.S. Government has certain rights in the invention.

FIELD OF THE INVENTION

The present invention generally relates to processing for creating display images from one or more of a plurality of imaging sensors devices, and in particular to such processing which occurs in relative real time with selectable viewing directions.

BACKGROUND OF THE INVENTION

Automatic stitching of high-resolution images into a single field-of-view mosaic is a capability currently being developed by researchers with disparate applications. Techniques have been developed to enable users to form panoramic views from individual snapshots taken by digital cameras. Typically, these types of techniques are employed in a non-real-time, post-processing environment to generate panoramic images or image sequences for later playback.

However, these techniques are not well suited a real-time, high performance environment. For example, a high performance aircraft or other moveable platform may be provided with multiple cameras for infrared or visible light, generating a plurality of images simultaneously or substantially simultaneously. The cameras can be distributed to provide a very wide angle of coverage. For example, six (6) cameras may provide $4\pi$ steradian coverage of a world exterior to the aircraft. Rather than an operator having to watch a separate display for each sensor, greater functionality could be provided by a system that can combine more than one sensor image in real time.

Typically, only a limited portion of the world exterior needs to be presented to an operator, such as a pilot or weapons officer, at any one time via a helmet mounted display (HMD).

In view of the above discussion, it would be beneficial to have a distributed aperture system which enables operators to quickly change line-of-sight views.

SUMMARY OF THE INVENTION

One embodiment of the present invention provides a method for displaying an image captured by a distributed aperture system (DAS), the method comprising: determining a display line of sight (LOS) and display field of view (FOV) corresponding to an operator display of a DAS; mapping the display LOS and the display FOV to a set of sensors of a plurality of sensors of the DAS; for each sensor of the set of sensors: identifying a set of sensor elements that define a minimum image capture area corresponding to the display LOS and the display FOV, processing image data collected by the identified set of sensor elements; and generating an image for the operator display from the processed image data.

The step of identifying a set of sensor elements may include determining vector coordinates of a three-dimensional (3-D) polygon corresponding to the display FOV expressed in a display LOS coordinate system and transforming the determined vector coordinates of the three-dimensional polygon corresponding to the display FOV to a coordinate system of a subject sensor of the set of sensors. The step of transforming the determined vector coordinates may include clipping the three-dimensional polygon based on a sensor viewing point and the coordinate system of the subject sensor of the set of sensors, to remove any part of the 3-D polygon that extends behind a near-clipping plane in the sensor coordinate system. The step of processing image data may includes projecting vertices of the clipped three-dimensional polygon to a two-dimensional coordinate system of the subject sensor, resulting in a two-dimensional polygon defining an image capture area. The step of processing image data may includes clipping the two-dimension polygon based on a physical image capturing boundary of the subject sensor defined by a set of sensor elements of the subject sensor. The step of processing image data may include determining a minimum bounding rectangle which encloses the clipped 2-D polygon and defines the minimum image capture area.

The step of identifying may include for each sensor of the set of sensors: determining vector coordinates of a three-dimensional (3-D) polygon corresponding to the display FOV expressed in a display LOS coordinate system; transforming vertices of the 3-D polygon from a display coordinate frame to a sensor coordinate frame; performing near-plane clipping of the transformed 3-D polygon; projecting vertices of the near-plane clipped polygon to a 2-D sensor image plane; performing X-Y clipping of the projected 2-D polygon; determining a minimum bounding rectangle which encloses the X-Y clipped polygon; and extracting a subimage from a subject sensor based on the minimum bounding rectangle. The operator display may be a helmet mounted, and the display LOS may be determined by an orientation of the helmet.

BRIEF DESCRIPTION OF THE DRAWINGS

The present invention is illustratively shown and described in reference to the accompanying drawings, in which:

FIG. 5 is a block diagram depicting further detail of processing step 405 of the method of FIG. 4;

DETAILED DESCRIPTION OF THE DRAWINGS

The present invention is introduced using examples and particular embodiments for descriptive purposes. Although a variety of examples are presented to show how various configurations can be employed to achieve the desired improvements, these particular embodiments are only illustrative and not intended in any way to restrict the inventions presented.

Figure 1A:
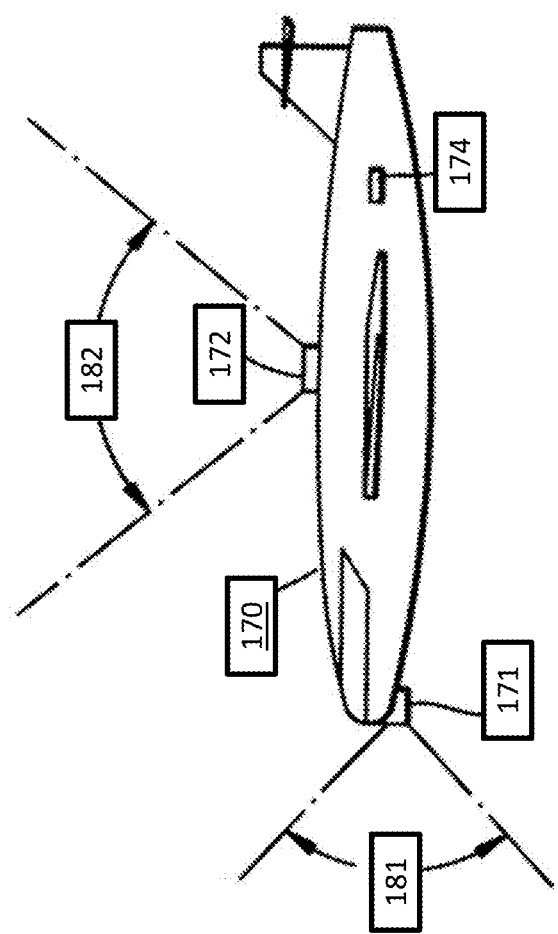
FIGS. 1A and 1B show side and front schematic views of a platform having a distributed aperture viewing system.
Figure 1B:
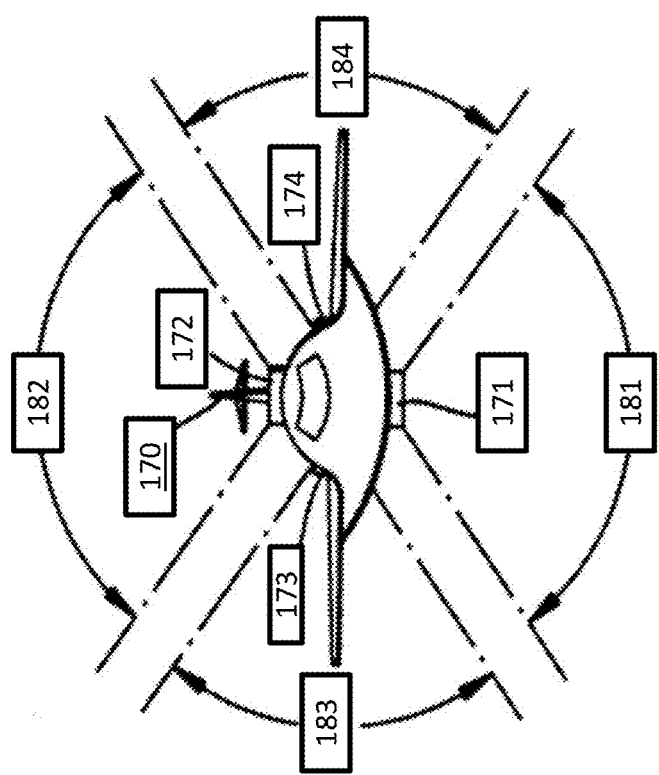

FIG. 1A is a side representational view of an aircraft 170 having a plurality of imaging sensors 171, 172, 174. FIG. 1B is a similar representational view of the front of aircraft 170 having an additional imaging sensor 173. Also shown for each imaging sensor is a representational field of view. Sensor 171 has field of view 181. Sensor 172 as field of view 182. Sensor 173 has field of view 183. Sensor 174 has field of view 184. Although the fields of view 181-184 are not shown to overlap, it is very possible that a sufficient number of sensors may be present, or they may have a sufficiently wide individual fields of view, such that they do, in fact overlap.

Figure 2:
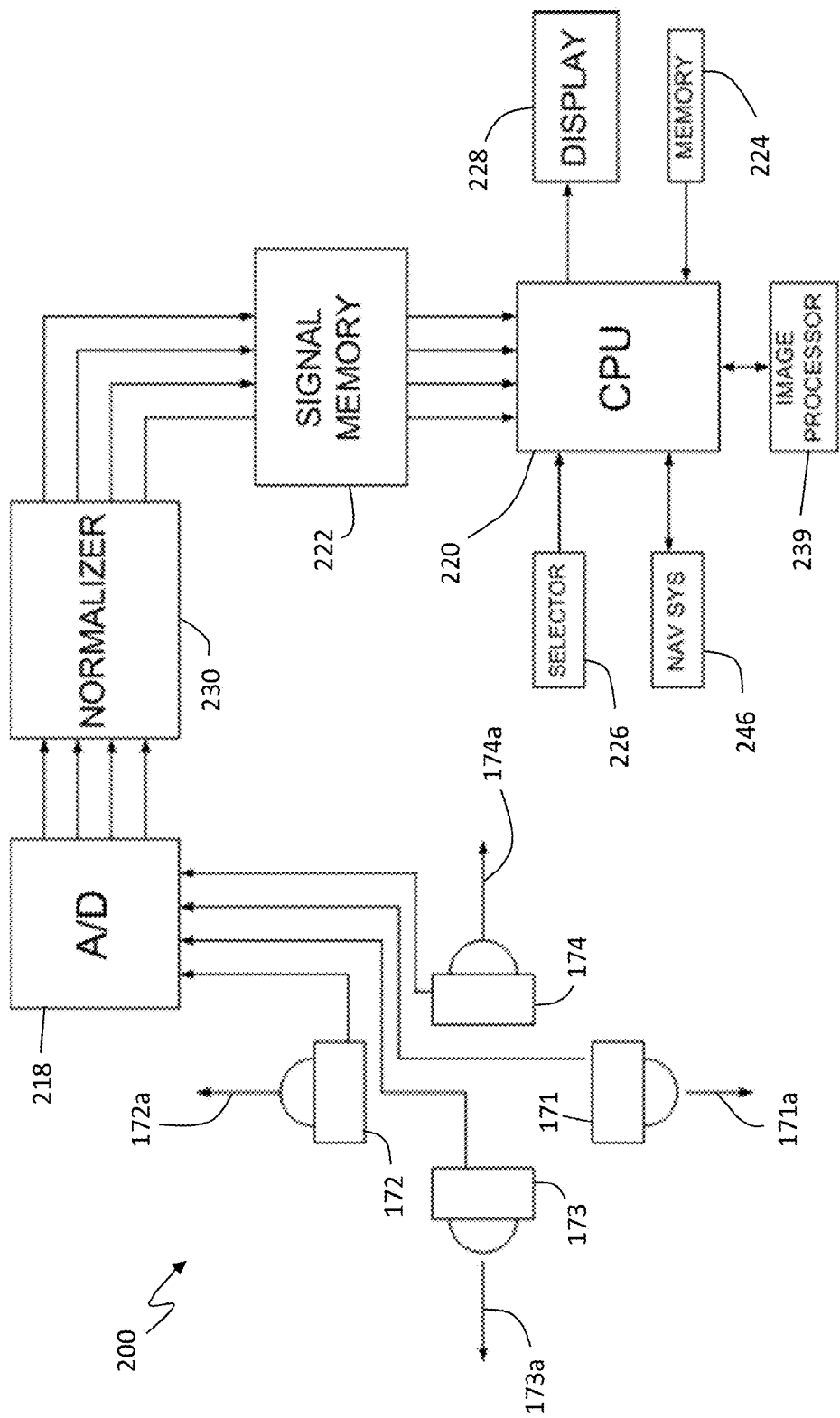
FIG. 2 shows a circuit schematic for the distributed aperture viewing system represented in FIGS. 1A and 1B and constructed in accordance with one embodiment of the present invention.

FIG. 2 shows a circuit schematic of an image processing system 200 constructed in accordance with one embodiment of the present invention, which system 200 is adapted to capture images from overlapping sensors or cameras and combine those images into a usable display. Representationally shown are image sensors 171-174 (FIG. 1B) which are commonly mounted on a mobile or stationary platform 170 (FIG. 1B), such as a land, sea or air vehicle. Imaging sensors 171-174 may be sensitive to the same wavelength spectrum, or may be sensitive to different wavelengths, such as visible and infrared. Each imaging sensor 171,172,173,174 has its own respective line of sight 171a,172a,173a,174a (sensor LOS), and its own respective field of view 181,182,183,184 (FIG. 1B) (sensor FOV). These respective lines of sight and fields of view may diverge in a viewing space or may overlap. Although sensors 171-174 are shown with just a two dimensional array, the description is equally applicable to a three-dimensional array.

Image sensors 171-174 are coupled to one or more analog to digital converters 218 for capturing the respective sensor images. The captured images may be passed through a normalizer 230 to provide comparable images for combination and are stored separately in signal memory 222. A central processing unit 220 is coupled to a display 228, a selector 226, an image processor 239, and optionally a navigation system 246. In the manner described below CPU 220 selects relevant portions of the stored images in memory 222 as determined by selector 226 and combines those images with the use of image processor 239 to provide output data for display 228. Selector 226 may include any suitable means for controlling both a display LOS and a display FOV. Thus, an operator could have access to either a broad FOV or a very narrow FOV as would be useful for providing a digital zoom function. Other functions, such as a freeze-frame or still capture may also be available through selector 226.

The purpose of the image processing system 200 is to provide a selectable view to a display operator on a mobile or stationary platform, which selectable view may be pointed in any three-dimensional direction LOS from the platform, and to responsively create an image for the operator of the selected LOS and a corresponding field of view FOV as provided by a combination of any and all imaging sensors located to view the selected LOS and FOV. The LOS and FOV may be selected by a nominal hand controls or other suitable means including sensing the position of a helmet mounted display worn by an operator. The system 200 may be capable of simultaneously creating a plurality of independently selectable viewing directions and respective fields of view for providing information to more than one display operator located either on the platform or remote from the platform.

Figure 3:
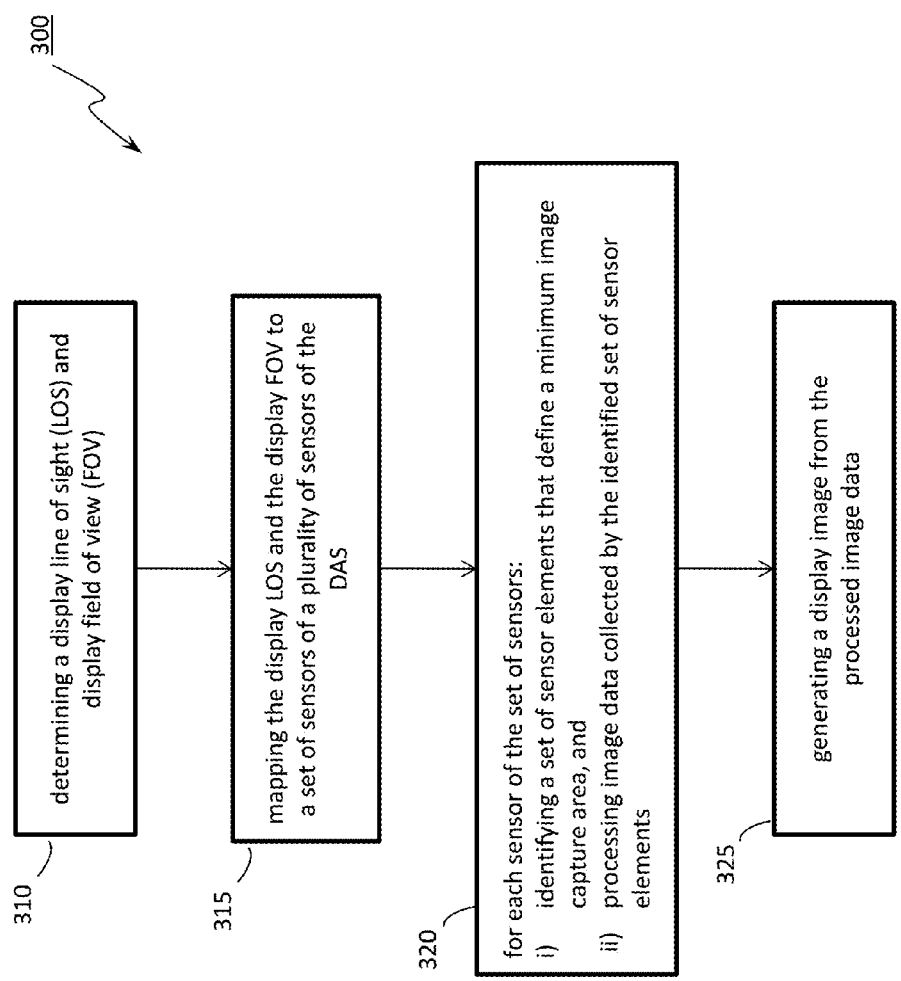
FIG. 3 is a block diagram depicting a process according to one embodiment of the present invention.

FIG. 3 shows a general block diagram 300 depicting the process steps used for selecting display image data from the different sensor images available. A primary objective of this processing system is determining a minimum rectangle of sensor data for use in providing a display image in order to more efficiently process relevant data in real time. This reduces any image processing delay from sensor to display. As will be described later, this process is also used to determine which sensors are used for producing a display image.

As described above, a display image may be selected in any one of a variety of LOS directions as determined by a display operator. A display image may further include a selectable FOV to provide either a broader view of the surroundings or a narrower and potentially magnified image of a selectable portion of the broader view. For these purposes, process diagram 300 shows a first step 310 of determining a display line of sight (LOS) and a display field of view (FOV). Next, the method of diagram 300 maps the display LOS and FOV to one or more sensors of the plurality of sensors of the distributed aperture system (DAS) in step 315. The sensors to which the display LOS and the display FOV are mapped may be preselected in accordance with the display LOS and the display FOV, or may be determined by the current processing method, as described below. This mapping is performed to convert the coordinates of the vertices of a polygon which outlines a display FOV from the selected display reference frame to each relevant sensor reference frame. Subsequent processing in step 320 identifies a set of sensor elements that define a minimum image capture area for each sensor and processes the image data from the identified set of sensor elements. Selecting a minimum image capture area reduces the amount of data that must be subsequently processed for purposes of speed and efficiency. Lastly, step 325 combines image data from the selected sensors to generate a display image.

It should be noted that the general processing steps described above will vary in specifics depending upon different types of systems and image capture methods. Image sensors, or cameras can use different optical designs to project images onto a device, such as a Focal Plane Array or Charge Coupled Device, which converts projected images to electrical signals. Examples of different optical designs include F-tan (theta) optics and F-theta optics. Other optical designs are possible and are included in this invention. Variations in the graphical processing methods which are included in this description may, and typically will, be needed in order to process images which are produced by using different camera optical designs. The examples provided below are specific to F-tan (theta) optics and F-theta optics.

Figure 4:
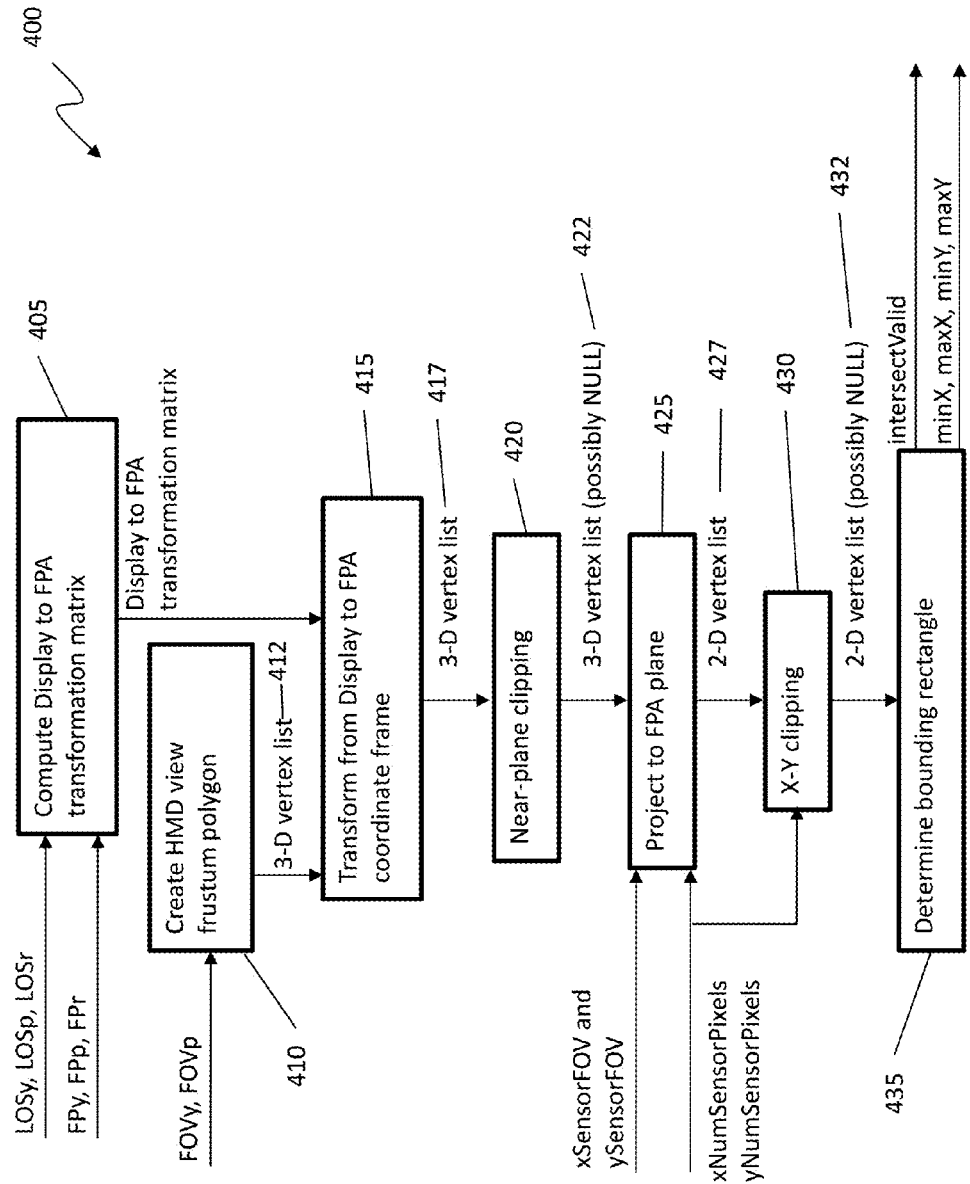
FIG. 4 is a block diagram depicting a processing method according to another embodiment of the present invention.

FIG. 4 shows a block diagram of the more detailed processing method 400. The first step 403 computes the display-to-sensor, in this case a focal plane array (FPA), transformation matrix for each sensor using a display LOS including azimuth LOSy, elevation LOSp and roll LOSr angles. Also used are angular values from each sensor including yaw FPy, pitch FPp, and roll FPr. Step 410 creates a display FOV polygon by defining a three-dimensional vertex list 412 in the display reference frame, using the display yaw FOVy and pitch FOVp angles. Step 415 then converts the 3-D vertex list 412 from the display coordinate or reference frame to each sensor FPA coordinate or reference frame. This produces a 3-D vertex list 417 in each sensor coordinate frame. Step 420 processes the 3-D vertex list 417 representing the display FOV polygon in each sensor reference frame, by near-plane clipping the display FOV polygon to eliminate portions thereof located behind a near-clipping plane. The clipped 3-D vertex list 422 is tested to see if it still includes any vertices to thereby eliminate each respective sensor when no vertex points remain.

The following step 425 takes the vertex list 422 representing the clipped display FOV polygon in each respective sensor frame and projects it onto a two-dimensional image plane for each sensor, using the sensor field of view (xSensorFOV and ySensorFOV) and the image size (xNumSensorPixels and yNumSensorPixels) for each respective sensor. Conversion to pixel coordinates may be done in this step, or later. In the next step 430 the projected two-dimensional vertex list undergoes X axis and Y axis clipping to eliminate any part or parts of the projected display FOV polygon which are not within the sensor FOV. The resulting 2-D vertex list 432 is again tested for the absence of vertices to thereby eliminate the sensor from further processing.

Although method 400 shows the step of projecting 425 prior to the step of X-Y clipping 430, these two steps may be combined to facilitate any suitable form of mathematical processing.

Lastly, step 435 determines a minimum bounding rectangle for the resulting 2-D vertex list 432 for each respective sensor. This minimum bounding rectangle outlines the smallest rectangular subimage that needs to be processed from each respective sensor to provide a useful display image.

Alternatively to the sequence of steps 425 of projecting to a sensor plane and step 430 of X-Y clipping the resulting image, the step 430 of X-Y clipping may be incorporated into the step 425 of projecting to the sensor plane.

FIG. 5 shows an example of step 405 in FIG. 4 for one method of computing the display-to-sensor transformation matrix for each sensor. Any suitable method may alternatively be used. Step 405 implements the formula shown to compute a coordinate transformation matrix which converts vectors from the display LOS coordinate frame to the sensor LOS coordinate frame. For example, if $\phi_{FPA}$ represents the sensor roll angle, $\theta_{FPA}$ represents sensor elevation angle, $\psi_{FPA}$ represents sensor azimuth angle and if $\phi_{LOS}$, $\theta_{LOS}$ and $\psi_{LOS}$ represent the corresponding display LOS orientation angles, where all angles are measured relative to the same reference coordinate frame such as a platform's (forward, right, down) coordinate frame, then the coordinate transformation matrix which converts vectors from the display LOS coordinate frame to the sensor LOS coordinate frame could be computed according to the equation shown in FIG. 5.

Figures 6, 7:
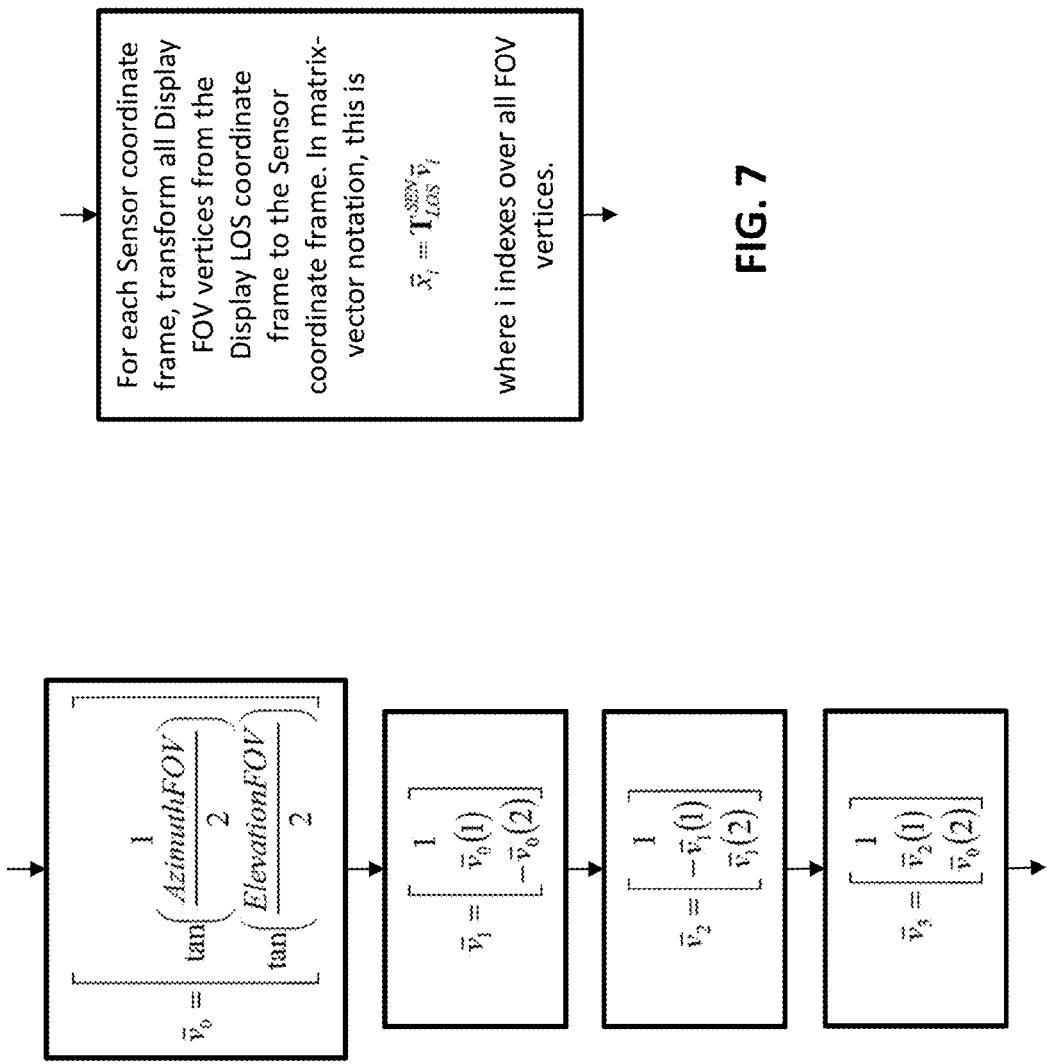
FIG. 6 is a block diagram depicting further detail of processing step 410 of the method of FIG. 4.
FIG. 7 is a block diagram depicting further detail of processing step 415 of method of FIG. 4.

FIG. 6 shows a flowchart of the mathematical progression for step 410 of FIG. 4 to create a polygon which describes the selected display field of view. The polygon is defined by a list of vertices which correspond to the corners of the display's FOV. The vertices should be ordered in a way that supports later processing stages; for example, counterclockwise as seen from the perspective center of the display. The vertices are expressed in a three-dimensional coordinate reference frame relative to the display; for example, in (forward, right, down) coordinates relative to the perspective center of the display.

FIG. 7 shows the matrix-vector notation for transforming all display field of view vertices from the display coordinate frame to the respective sensor coordinate fame.

FIG. 6 shows a flowchart of one method 800 for processing the vectors of a vertex list 417 to perform the near-plane clipping of step 420 in FIG. 4.

Figure 8:
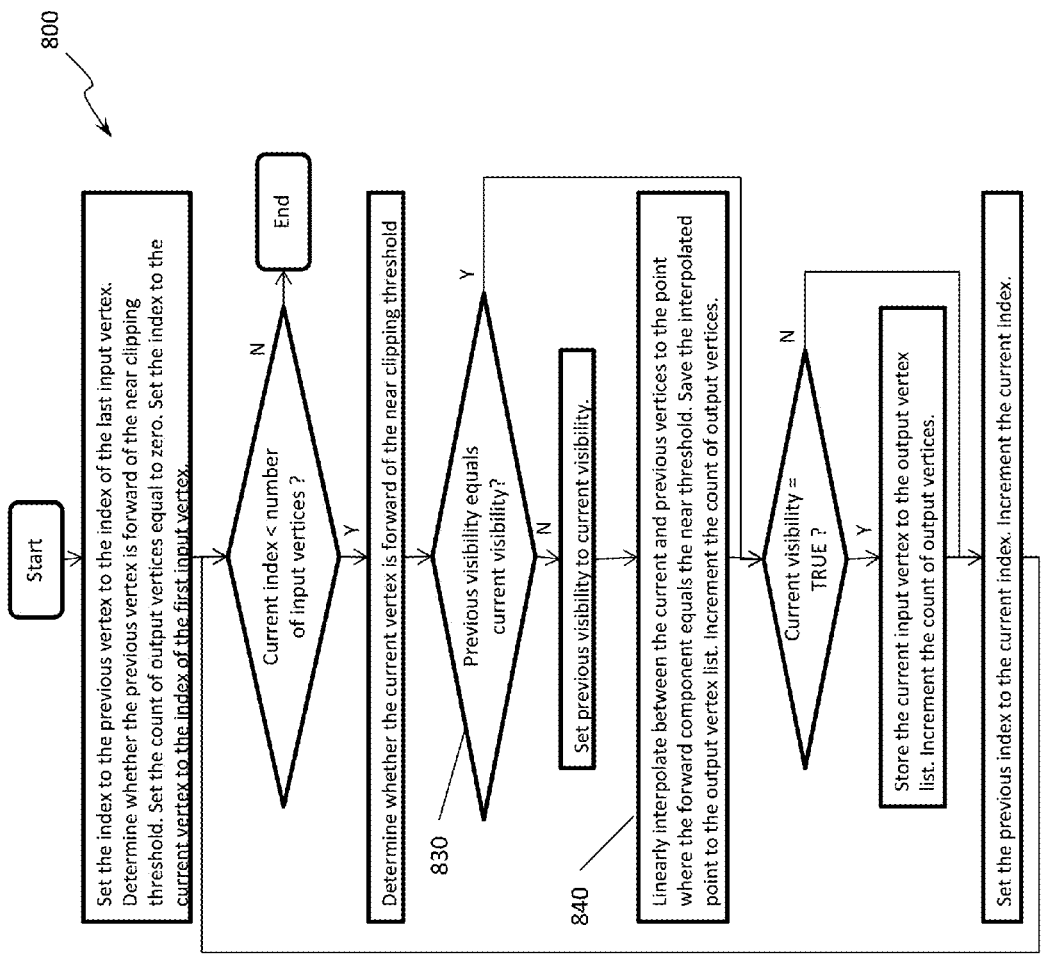
FIG. 8 is a block diagram depicting further detail of processing step 420 of method of FIG. 4.
Figure 9:
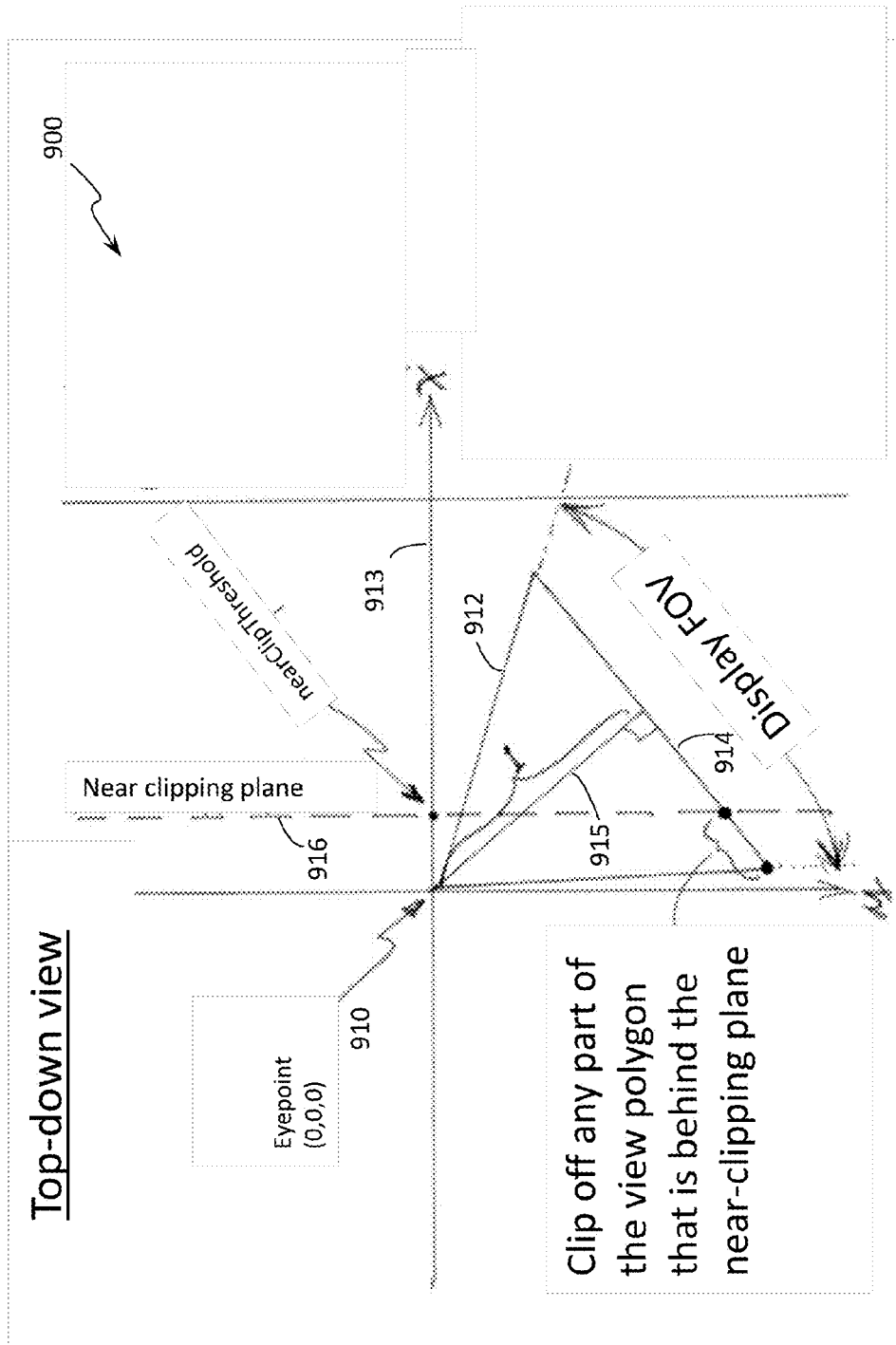
FIG. 9 is a diagram of the processing resulting from the method of FIG. 8.

FIG. 9 shows a two-dimensional, top down diagram 900 of the near-plane clipping process of method 800. An eyepoint 910, of a display FOV 912, is shown at the center of a nominal x-y sensor reference plane. A sensor (not shown) is typically oriented so that the center of the sensor's FOV points along the positive x axis 913. A 3-D display vertex list 417 is notionally depicted in the 2-D diagram as a display polygon 914 perpendicular to the center of the display LOS 915. Near-clipping plane 916 includes a nominal positive x-axis value and causes elimination of portions of the display polygon 914 located to the left of near-clipping plane 916. The method of FIG. 8 functions by cycling through each of the vertices of vertex list 417 and determining whether each vertex lies to the left of near clipping plane 916 as shown in decision step 830. If a vertex is not to the left of near clipping plane 916, the Yes branch of step 930 leaves the visibility of that vertex point alone. If a vertex does lie to the left of near-clipping plane 916, the No branch of decision step 830 causes a linear interpolation of the vector to the point where it crosses near clipping plane 916, in process step 840. The near plane clipping process ensures that all of the X (forward) components of the clipped display polygon 914 will be greater than or equal to the near-plane clipping threshold, which is greater than zero. This means that perspective projection, which involves division by X, can be safely done.

Figure 10:
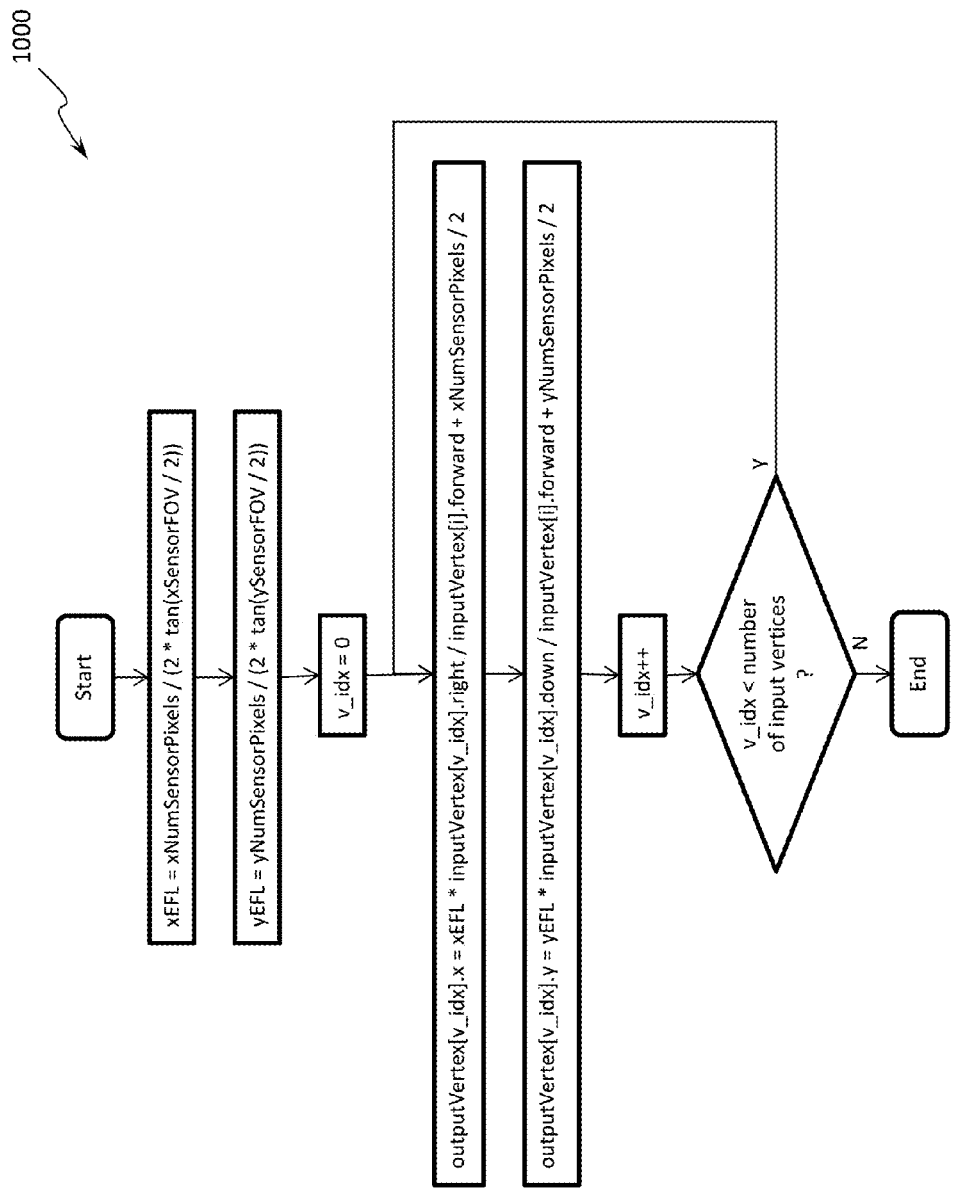
FIG. 10 is a block diagram depicting further detail of processing step 425 of method of FIG. 4.
Figure 11:
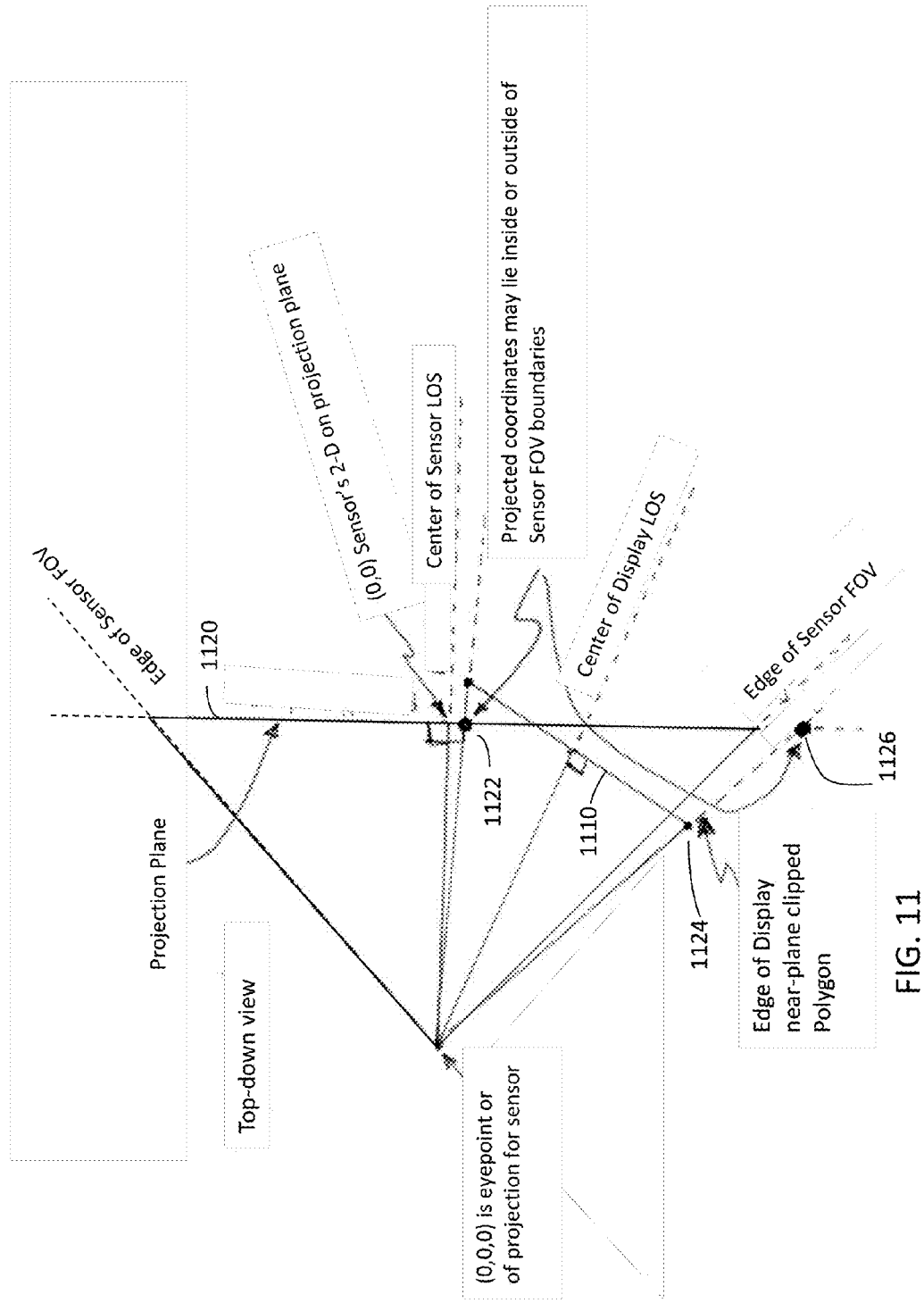
FIG. 11 is a diagram of the processing resulting from the method of FIG. 10.

FIG. 10 is a flowchart of an F-tan (theta) vector processing method 1000 of 3-D vertex list 422 (FIG. 4) performed by step 425 (FIG. 4) to project the near-plane clipped display polygon in a sensor reference frame onto a two-dimensional projection plane of that sensor, for a sensor using F-tan (theta) image capture. FIG. 11 is a two-dimensional example of that projection process. FIG. 11 is a side view, wherein the sensor forward axis points to the right. A near-plane clipped polygon 1110 is shown with respect to a 2-D sensor projection plane 1120. The edges of polygon 1110 may be located either within the sensor FOV such as projection point 1122, or may be located outside of the sensor FOV such as projection point 1126. The F-tan (theta) process 1000 multiplies by scale factors to convert vertices to pixel coordinates relative to the center of the sensor and then adds constants so that the x, y coordinates are in units of pixels and are measured from a corner of the sensor.

Figure 12:
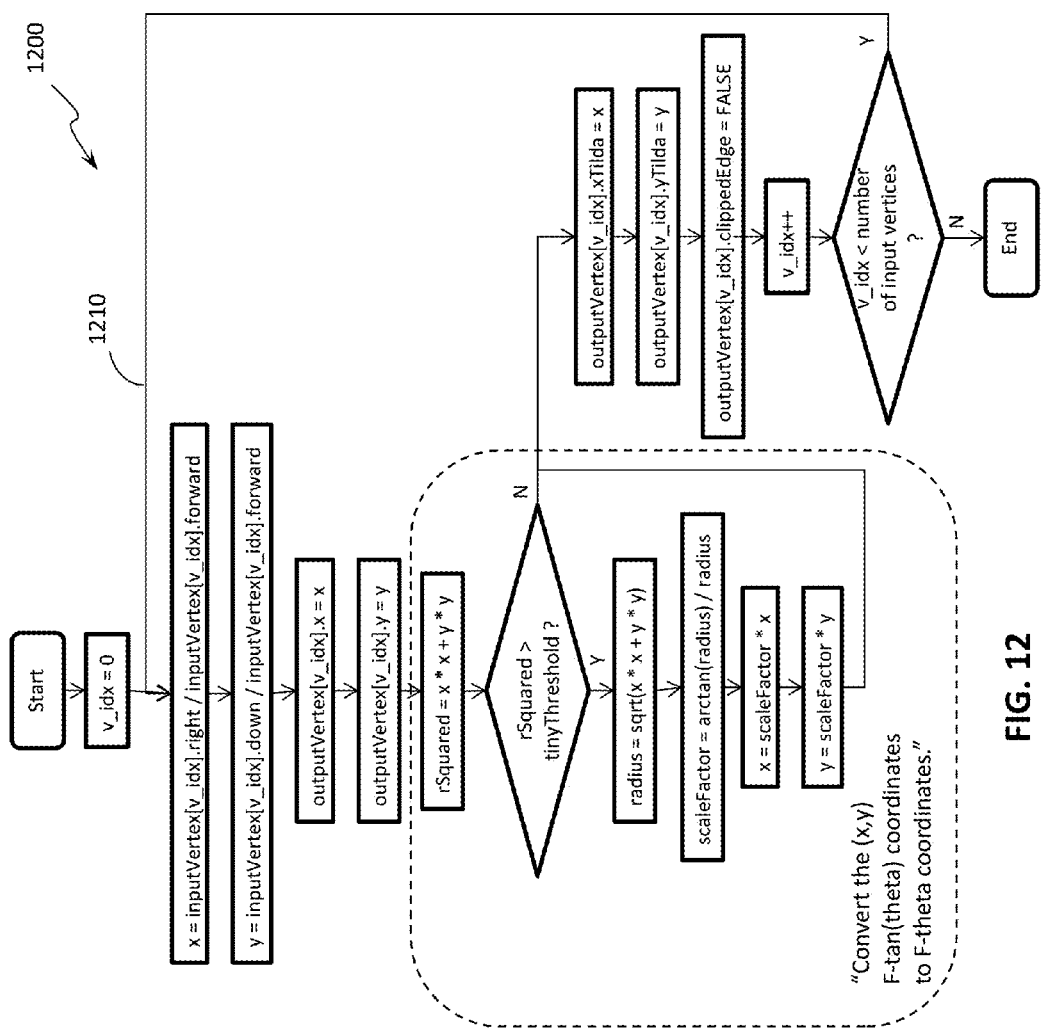
FIG. 12 is a block diagram depicting alternative further detail of processing step 425 of method of FIG. 4.

FIG. 12 shows an F-Theta vector processing method 1200 for vertex list 422 for use when the respective sensor uses F-Theta image capture. This F-Theta routine does a nonlinear conversion from F-tan (theta) to F-Theta (xTilda, yTilda) coordinates inside the loop 1210. The F-Theta routine does not scale to pixels or add offsets. Those 2-D operations could have been performed by separate routines that follow one that only projects to the projection plane; i.e. it just does px=right/forward and py=down/forward.

Figure 13:
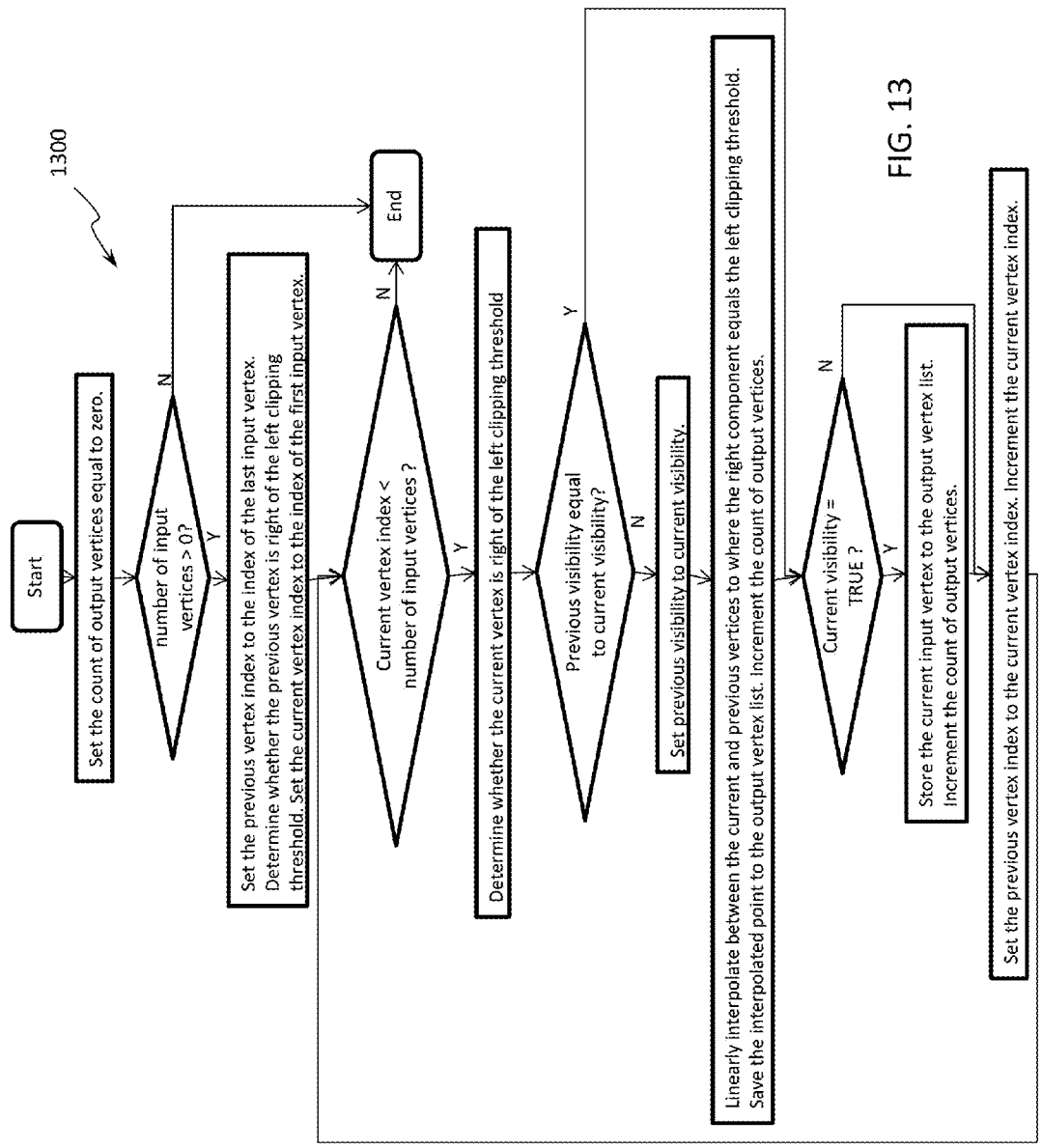
FIG. 13 is a block diagram depicting further detail of processing step 430 of method of FIG. 4.
Figure 14:
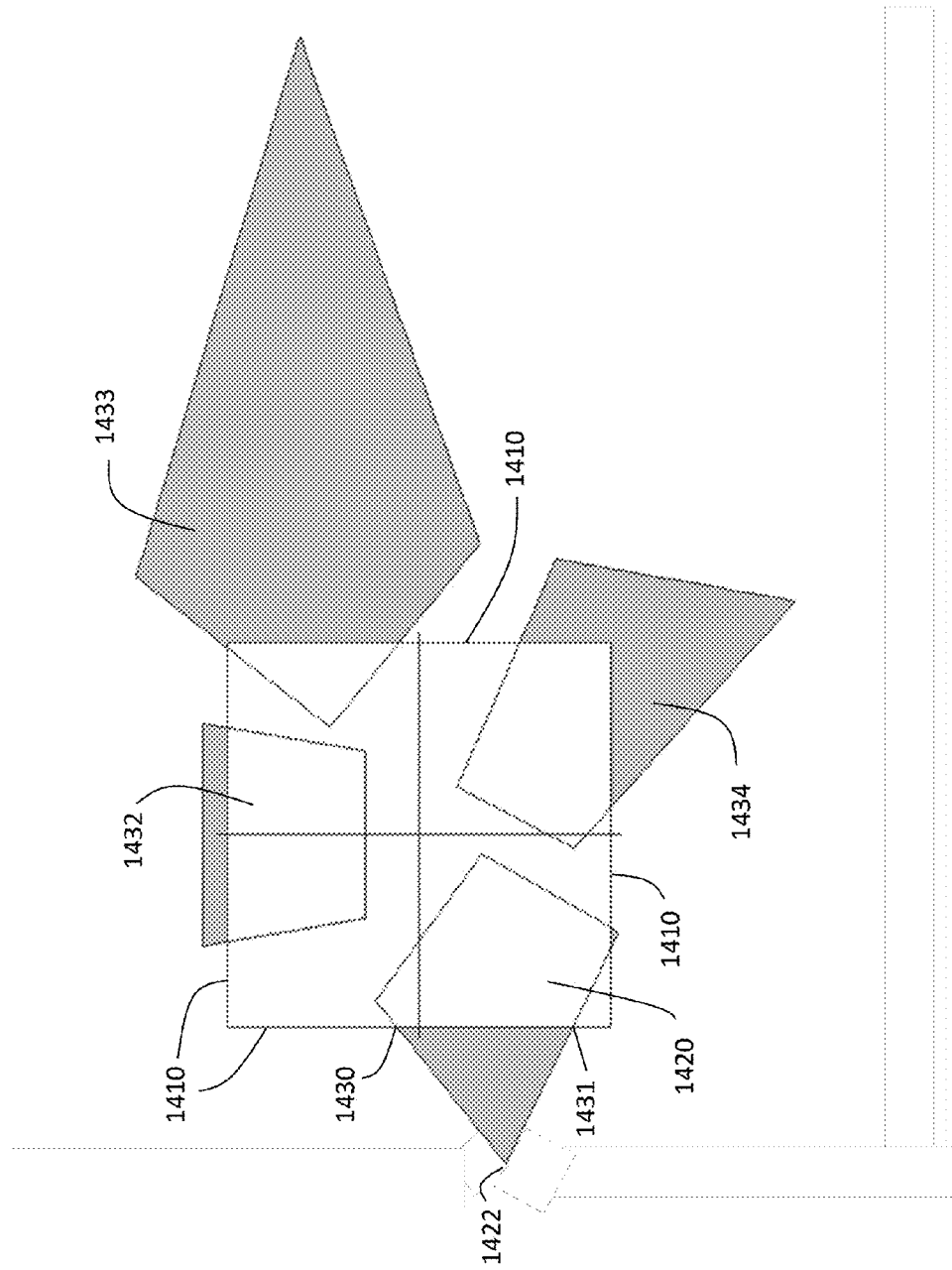
FIG. 14 is a diagram of the processing resulting from the method of FIG. 13.

FIG. 13 is a flowchart for a process 1300 for the step 430 of x-y clipping of FIG. 4, for images captured by an F-tan (theta) sensor. FIG. 14 is a representational diagram of this x-y clipping process. FIG. 14 shows the sensor or FPA edges 1410 and a projected viewing area 1420 in relation to the sensor edges 1410. As shown, the shaded area of projected viewing area 1420 lies outside of sensor edges 1410 and therefore cannot be captured by the respective sensor. For this reason, vertex 1422 is deleted from vertex list 427 and is replaced by vertices 1430, 1431 in vertex list 432. FIG. 14 shows a diagram of various alternative projections 1432, 1433, 1434 of display FOV polygons onto the sensor plane. FIG. 13 only shows the exemplary process steps used for the left side clipping of the projected viewing area relative to the left edge of the sensor. These process steps are then modified to provide clipping along the right, top and bottom sides of the sensor array.

Figure 15:
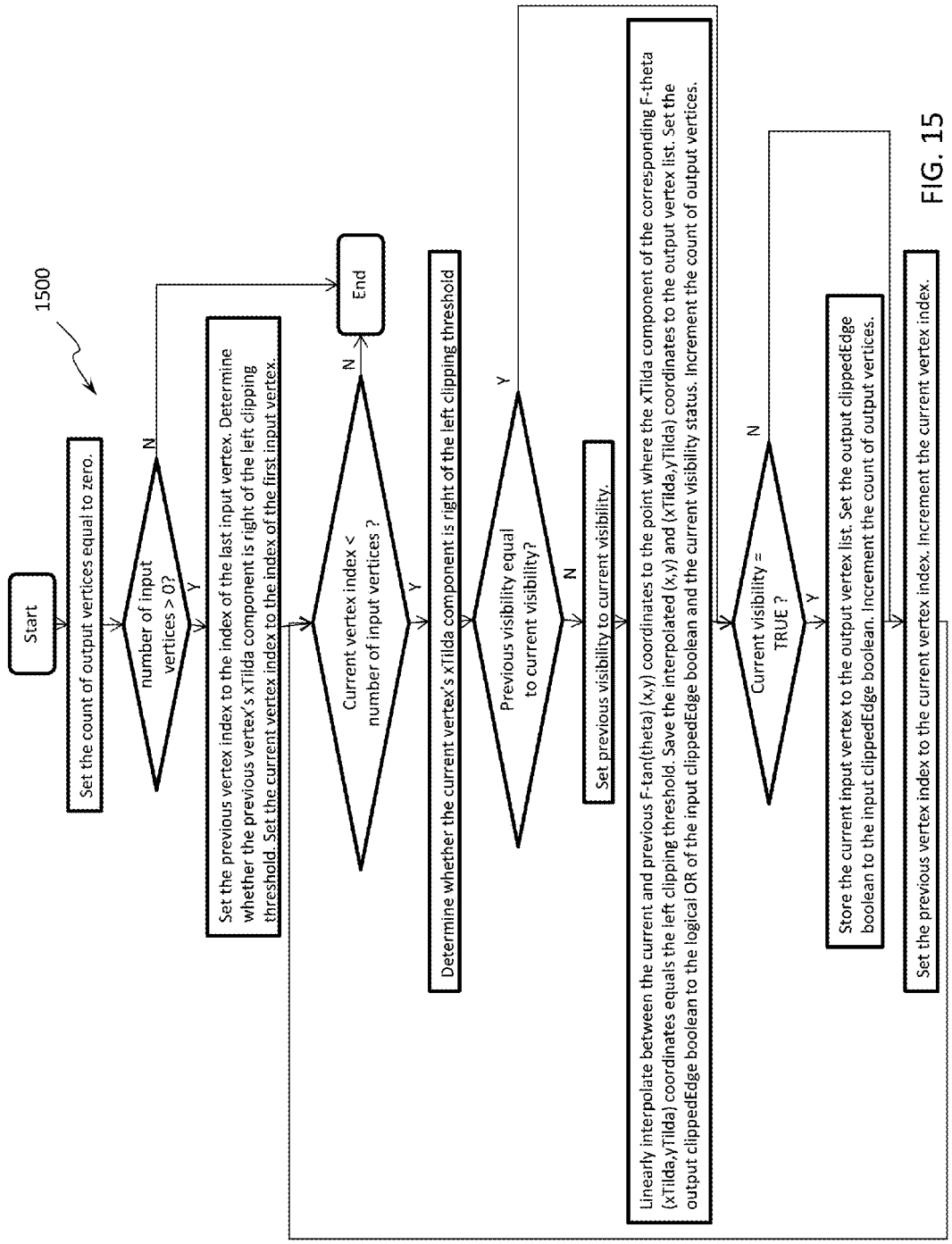
FIG. 15 is a block diagram depicting alternative further detail of processing step 430 of method of FIG. 4.
Figure 16:
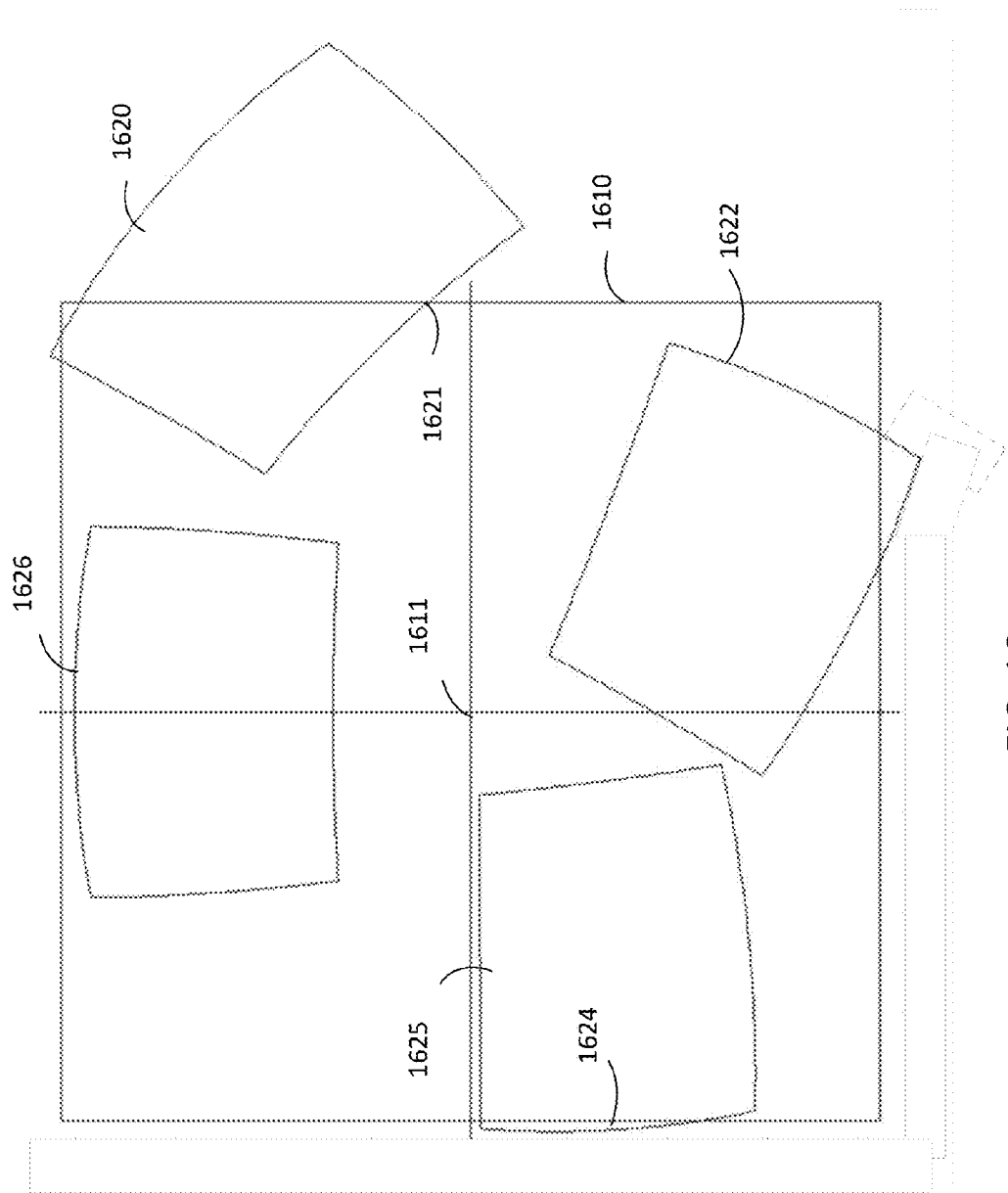
FIG. 16 is a diagram of the processing resulting from the method of FIG. 15.

FIG. 15 is a flowchart for a process 1500 for the step 430 of x-y clipping of FIG. 4, for images captured by an F-Theta sensor. FIG. 15 only shows the exemplary process steps used for left side clipping of the display sensor field. These process steps are readily modified to provide clipping of the right, top and bottom sides of the sensor array. FIG. 16 is a diagram of a display field of view 1610 onto which four quasi-polygons 1620, 1622, 1624, 1626 represent exemplary projections of a display FOV at thug different display orientations relative to the sensor. Those portions of the projections located outside of display FOV 1610 need to be clipped from the display FOV as they cannot be viewed by the sensor. Note that the straight lines of each display field of view edge project to an and which tends to curve around the origin 1611. This x-y clipping process can produce a quasi-polygon with a mix of curved and straight edges, and with more or fewer sides and vertices than the original, unclipped quasi-polygon. The points of intersection, i.e. 1621, between the edge of display FOV 1610 and the curved edge of a projection 1620 can be determined by using any suitable numerical method such as Regula Falsi.

Figure 17:
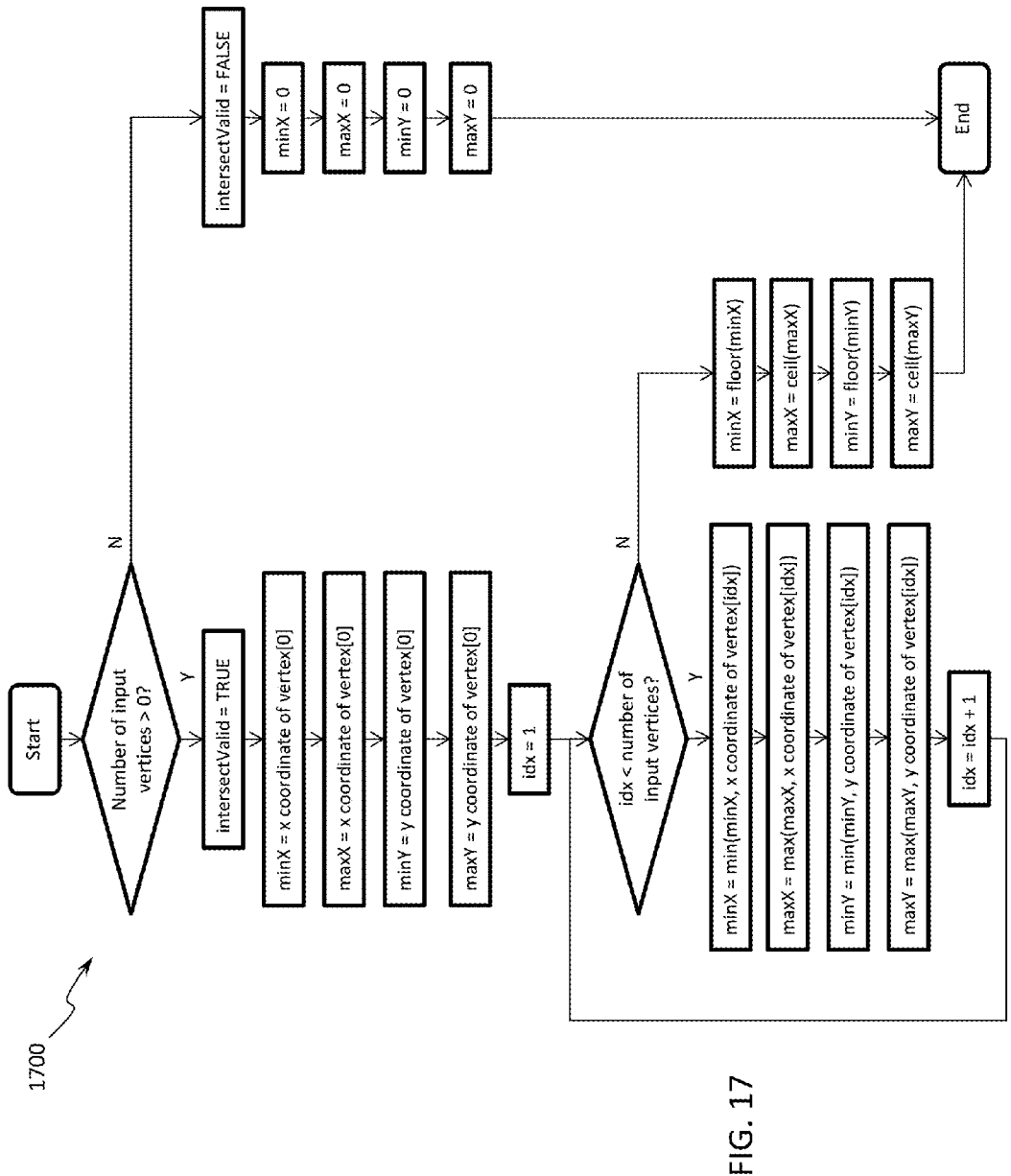
FIG. 17 is a block diagram depicting further detail of processing step 435 of method of FIG. 4.
Figure 18:
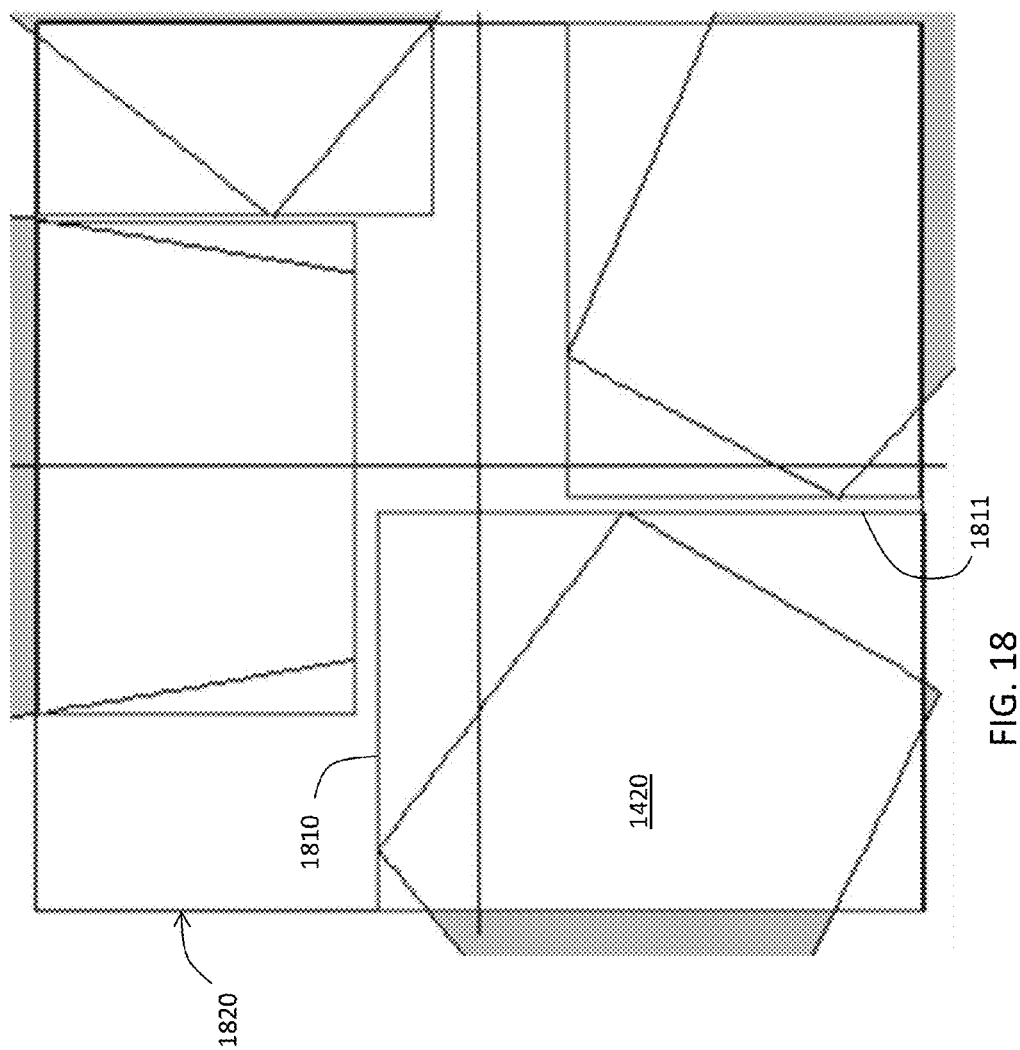
FIG. 18 is a diagram of the processing resulting from the method of FIG. 17.

FIG. 17 shows an exemplary processing method 1700 for processing 2-D vertex list 432 to determine a minimum bounding rectangle for the display pixels from an F-tan (theta) sensor array. FIG. 18 illustrates such minimum bounding rectangles as would be used for the sensor projections represented in FIG. 14. The shaded areas would have been removed by the previous X-Y clipping step described in reference to FIGS. 13 and 14. For example, projection 1420 is enclosed within lines 1810 and 1811 along with the left and bottom edges of sensor array 1820. The process 1700 finds the minimum and maximum X and Y coordinates for all vertices of each X-Y clipped polygon. Those four numbers (minimum X, maximum X, minimum Y, maximum Y) define the corners of a minimum bounding rectangle that completely encloses the X-Y clipped polygon.

Figure 19A:
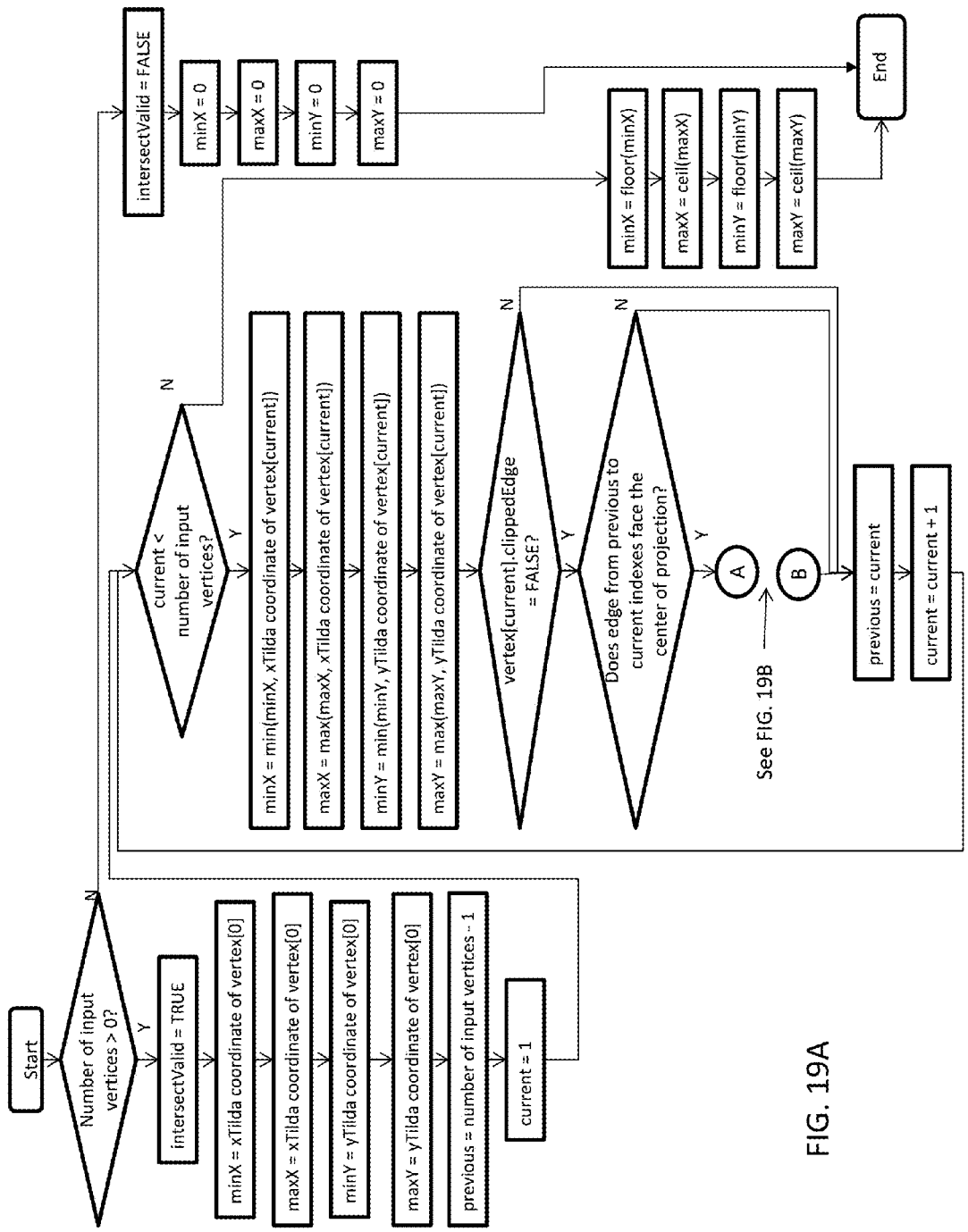
FIGS. 19A and 19B are a block diagram depicting alternative further detail of processing step 435 of method of FIG. 4.
Figure 19B:
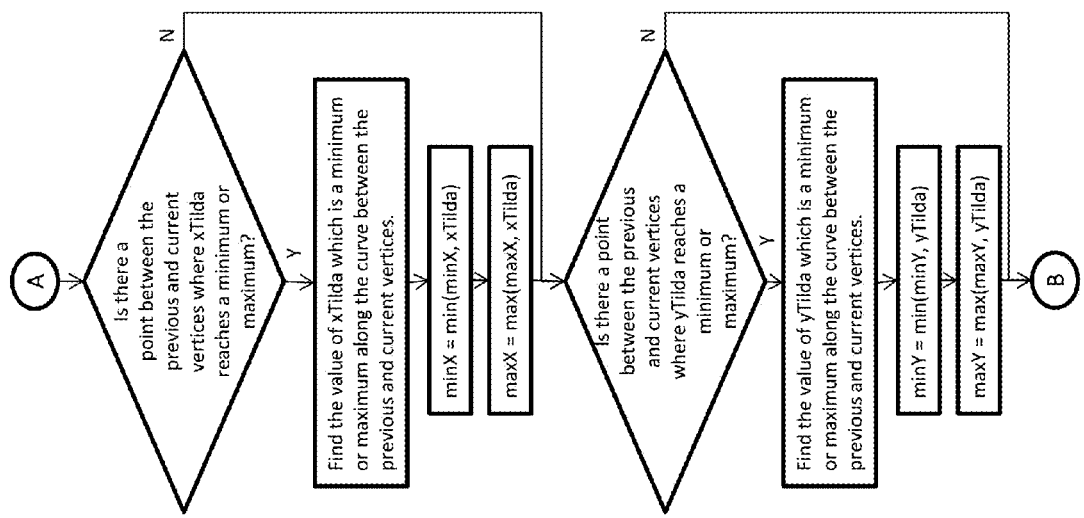

FIGS. 19A and 19B show an exemplary vertex processing method for determining the minimum hounding rectangles for an F-Theta sensor.

The present invention is illustratively described above in reference to the disclosed embodiments. Various modifications and changes may be made to the disclosed embodiments by persons skilled in the art without departing from the scope of the present invention as defined in the appended claims.

What is claimed is:

1. A method for displaying an image captured by a distributed aperture system (DAS), the method comprising:
   determining a display line of sight (LOS) and display field of view (FOV) corresponding to an operator display of the DAS;
   mapping the display LOS and the display FOV to a set of sensors of a plurality of sensors of the DAS;
   for each sensor of the set of sensors:
      identifying a set of sensor elements that defines a minimum image capture area corresponding to the display LOS and the display FOV;
      processing image data collected by the identified set of sensor elements; and
      generating an image for the operator display from the processed image data,
      wherein the step of identifying a set of sensor elements includes:
         determining vector coordinates of a three-dimensional (3-D) polygon corresponding to the display FOV expressed in a display LOS coordinate system;
         transforming the determined vector coordinates of the 3-D polygon to a coordinate system of the subject sensor by clipping the 3-D polygon, based on a viewing point and the coordinate system of the subject sensor, to remove any part of the 3-D polygon that extends behind a near-clipping plane defined in the sensor coordinate system thereby removing parts of the 3-D polygon that are not within an FOV of the subject sensor;
         projecting vertices of the clipped 3-D polygon onto a two-dimensional (2-D) coordinate system of the subject sensor, resulting in a projected 2-D subject polygon defining an image capture area;
         performing X-axis and Y-axis clipping of the projected 2-D polygon to eliminate any part of the near-plane clipped sensor reference frame in the sensor reference frame which is outside a 2-D area viewable by the sensor to create a projected 2-D image vertex list in the sensor reference frame;
         tracking the number of vertices in the projected 2-D image vertex list of the subject sensor; and
         eliminating the subject sensor from use in the display image when a number of vertices in its respective projected 2-D image vertex list equals zero.

2. The method of claim 1, wherein the step of identifying a set of sensor elements further includes:
   clipping the 2-D polygon based on a physical image capturing boundary of the subject sensor defined by a set of sensor elements of the subject sensor.

3. The method of claim 1, wherein the step of identifying a set of sensor elements further includes:
   determining a minimum bounding rectangle which encloses the clipped 2-D polygon and defines the minimum image capture area.

4. The method of claim 3, wherein the step of identifying a set of sensor elements further includes:
   extracting a subimage from a subject sensor based on the minimum bounding rectangle.

5. The method of claim 1, wherein the operator display is helmet mounted and the display LOS is determined by an orientation of the helmet.

6. A method for processing images for a distributed aperture system (DAS) having multiple sensors and at least one display having a line-of-sight (LOS) which can be selectively oriented in a variety of directions, comprising:
- determining minimum bounding rectangles of sensor pixels for each sensor of the DAS, for combination in creating a display image, comprising the steps of:
  - determining a display reference frame to sensor reference frame field-of-view (FOV) transformation matrix using a display LOS azimuth, elevation and roll angles and sensor azimuth, elevation and roll angles;
  - creating a 3-D display polygon vertex list in a display reference frame using a display FOV azimuth and elevation dimensions;
  - transforming the 3-D display polygon vertex list from the display reference frame into the sensor reference frame using the display to sensor FOV transformation matrix to form a sensor reference frame vertex list;
  - performing near-plane clipping on the sensor reference frame vertex list to eliminate any part of the polygon situated behind a near-clipping plane defined in the sensor reference frame thereby removing parts of the 3-D polygon that are not within an FOV of the subject sensor;
  - projecting the near-plane clipped sensor reference frame vertex list onto a 2-D sensor reference frame and performing X-axis and Y-axis clipping to eliminate any part of the near-plane clipped sensor reference frame vertex list in the sensor reference frame which is outside a 2-D area viewable by the sensor to create a projected 2-D image vertex list in the sensor reference frame;
  - tracking the number of vertices in the projected 2-D image vertex list of each sensor;
  - eliminating a sensor from use in the display image when a number of vertices in its respective projected 2-D image vertex list equals zero; and
  - determining a minimum bounding rectangle of the sensor array to capture the projected and clipped 2-D image.

7. The method of claim 6, wherein the display LOS and the sensor azimuth, elevation and roll angles are both relative to a common point or a common platform.

8. A system for processing display images for a distributed aperture system having at least a plurality of sensors, comprising:
- a processor; and
- processing instructions which when executed perform the method of claim 1.

\* \* \* \* \*